Van Wagner's Hellebore & Sulphur Duster
for Fruit trees, Grape Vines &c.
No. 119,547. Patented Oct. 3, 1871.
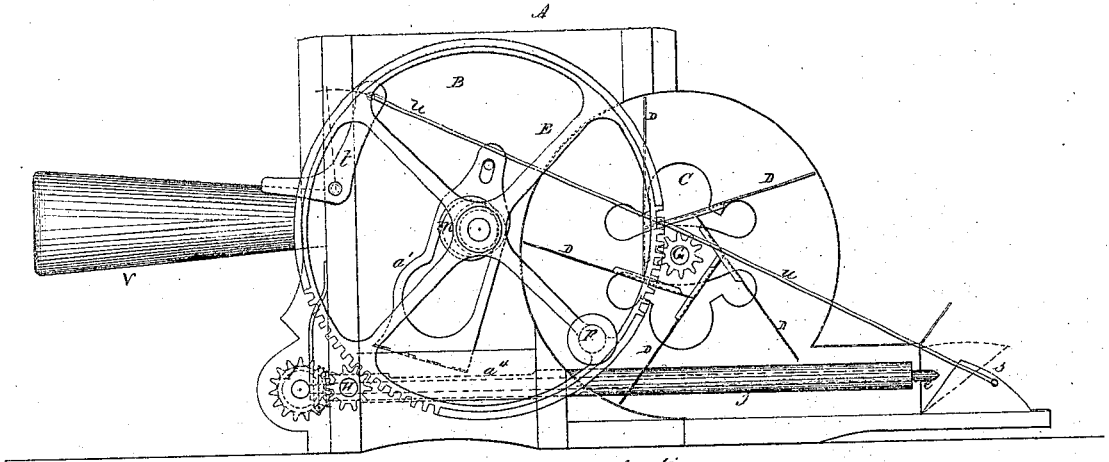
Fig. 1. side elevation
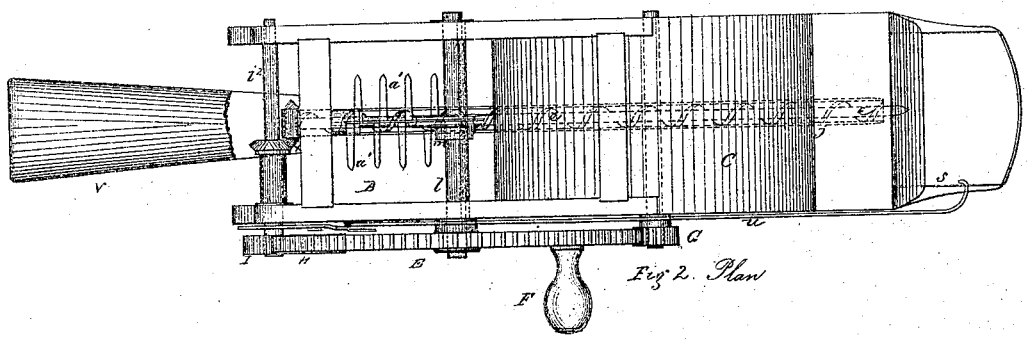
Fig. 2. Plan
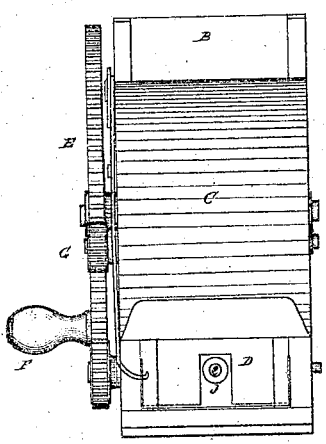
Fig. 3. End view 119,547

UNITED STATES PATENT OFFICE.

PETER SPOHN VAN WAGNER, OF SALTFLEET TOWNSHIP, CANADA.

IMPROVEMENT IN DEVICES FOR DESTROYING INSECTS.

Specification forming part of Letters Patent No. 119,547, dated October 3, 1871.

*To all whom it may concern:*

Be it known that I, PETER SPOHN VAN WAGNER, of the township of Saltfleet, in the county of Wentworth, in the Province of Ontario, Canada, have invented a certain new and useful machine for discharging powdered hellebore, sulphur, ashes, snuff, &c., or any other powdered substance on current and gooseberry-bushes, grape and hop-vines, fruit-trees, and shrubs, for the purpose of destroying caterpillars and insects of all kinds, and also for the purpose of preventing the growth of funguses or mildew, to which grape and other vines are frequently subject.

The machine in simple in construction, convenient in use, effective in operation, and so arranged as to discharge the material used by a fan-blast within a current or tube of air, by which the heavier particles are prevented from falling directly after leaving the nozzle, as is the case with all other methods; also, an adjustable lip to throw the sulphur, &c., upward under the leaves of plants.

Figure 1 represents an elevation of the machine with the side taken off to show the internal construction. Fig. 2 is a plan of the machine. Fig. 3 is an end view.

A represents the side of the machine divided into chambers; B, the hopper for the material; and c, the chamber for the divided fan D. E is a drive-wheel operated by the handle F. G is a small pinion driven by the drive-wheel for turning the fan. H is another pinion driven by E, which imparts motion to another pinion, I, which has a shaft, $i^2$, on which is keyed bevel-gear $x$, which, in turn operates the screw or worm $e$ inside the pipe $j$. On the shaft $l$ of the drive-wheel E is keyed a grooved eccentric, $m$, which causes the agitator $a^1$ to move back and forth for the purpose of keeping up a continual agitation of the material, so as to allow it to feed easily into the pipe $j$ through the opening $a^4$ cut into it, as shown. The worm or spiral screw $e$ carries the sulphur, &c., to the mouth of the tube, when the current of air at the nozzle produced by the fan completely envelops the sulphur, &c., as it issues from the tube, and carries it and showers it on the vines, as desired. The feed $a^4$ is so arranged that the distribution of the dusting-powder is regulated as necessity requires. It is done simply by turning a small screw, $r$, on the bottom of the machine, which releases the tube $j$ and allows it to be turned slightly so as to decrease the size of the opening for the admission of material into the tube. By this means the quantity of dusting material can be nicely regulated to suit the wishes of the operator. It is frequently necessary in dusting plants, vines, &c., with sulphur and hellebore, to throw it upward under the leaves, in order to destroy insects lodged there. This is well provided for by a movable lip, $s$, at the nozzle, which lies flat when not required. When the dust is to be thrown upward underneath the leaves it is raised to an angle of forty-five degrees by means of the thumb being placed on the bell-crank $t$ attached to the side of the machine, as shown, connected to the lip by the connecting-rod $u$.

It will be observed that the machine is held in the left hand by the handle V, and the end of the bell-crank projects a little from the end of the machine and is fastened in such a manner that the operator has only to raise his thumb and depress the crank, which action elevates the movable lip and causes an upward blast of air and dusting-powder to the under side of leaves.

Every year vast quantities of fruit and trees, vines and bushes are destroyed by the innumerable number of caterpillars and insects of various kinds, and there is no effectual remedy but dusting them with some powdered substance that will destroy them, and my machine is the most convenient and effective instrument yet invented for that purpose, and its peculiar advantages over all others are: First, the discharge of sulphur, &c., is regular and continuous, and may be regulated in quantity as desired. Second, a greater amount of work can be accomplished with it and with more ease. Third, the discharge of dust may be horizontal or upright. Fourth, any powdered substance can be used in the machine and no skill is required to work it. Fifth, as much work can be done with it in thirty minutes as would be done in thirty-six hours by hand, and, at the same time, done better.

What I claim as my invention is an improved machine for dusting plants, vines, &c., as follows:

1. An improved fan D, the wings of which stand at an angle of twenty degrees forward of the center and divided, as shown in Fig. 3, passing astride of the feed-pipe $j$.

2. A new method of discharging the dust inside a tube current of air, free from contact with the nozzle, by means of the arrangement and combination of feed-pipe $j$ and worm or screw $e$, as shown, for carrying a regular supply of dust to the nozzle.

3. The arrangement and application of the oscillating agitator $a^1$, operated by the eccentric $m$ for working the dust to the worm inside the feed-pipe.

4. The arrangement of the movable lip $s$ for throwing the dust upward when necessary, operated by bell-crank $t$ and connecting-rod $u$; also, hollow handle $v$ for holding and elevating machine, substantially as, in the manner, and for the purpose specified.

Dated at Hamilton, Canada, this 7th day of June, 1871.

P. S. VAN WAGNER.

Witnesses:
W. BRUCE,
WALTER ATHERTON. (11)